United States Patent [19]

Tamura et al.

[11] Patent Number: 5,281,371
[45] Date of Patent: Jan. 25, 1994

[54] METHOD AND APPARATUS FOR FORMING SUBSTRATE SHEET FOR OPTICAL RECORDING MEDIUM

[75] Inventors: Miki Tamura; Tsuyoshi Santoh; Osamu Kanome, all of Yokohama, Japan

[73] Assignee: Canon Kabushiki Kaisha, Tokyo, Japan

[21] Appl. No.: 791,308

[22] Filed: Nov. 14, 1991

[30] Foreign Application Priority Data

Nov. 16, 1990 [JP] Japan .................. 2-308724

[51] Int. Cl.$^5$ .................................. B29C 35/10
[52] U.S. Cl. ............................. 264/1.3; 264/1.4; 264/1.6; 264/106; 264/171; 264/22; 264/284; 425/174.4; 425/327; 425/363
[58] Field of Search ............... 264/171, 1.3, 1.4, 1.6, 264/106, 107, 22, 284; 425/174.4, 327, 363; 428/64

[56] References Cited

U.S. PATENT DOCUMENTS

| | | | |
|---|---|---|---|
| 3,072,519 | 1/1963 | Salzman | 156/200 |
| 3,751,550 | 8/1973 | Nauta . | |
| 3,839,514 | 10/1974 | Nauta . | |
| 3,893,795 | 7/1975 | Nauta | 425/403 |
| 4,211,743 | 7/1980 | Nauta et al. | 264/284 |
| 4,543,225 | 9/1985 | Beaujean | 264/167 |
| 4,548,772 | 10/1985 | Kawamata | 264/106 |
| 4,790,893 | 12/1988 | Watkins | 264/1.3 |
| 4,836,874 | 6/1989 | Foster | 264/1.3 |
| 4,859,392 | 8/1989 | Vetter | 425/363 |
| 4,956,214 | 9/1990 | Imataki et al. | 264/107 |
| 5,026,510 | 6/1991 | Yashima | 264/1.3 |
| 5,048,745 | 9/1991 | Sato et al. | 264/107 |
| 5,075,060 | 12/1991 | Imataki | 264/1.3 |

FOREIGN PATENT DOCUMENTS

| | | | |
|---|---|---|---|
| 0369780 | 5/1990 | European Pat. Off. . | |
| 0369781 | 5/1990 | European Pat. Off. . | |
| 61-76328 | 4/1986 | Japan | 264/171 |
| 63-14340 | 1/1988 | Japan | 264/1.4 |
| 3-26532 | 2/1991 | Japan | 264/1.6 |

*Primary Examiner*—Jeffery Thurlow
*Attorney, Agent, or Firm*—Fitzpatrick, Cella, Harper & Scinto

[57] ABSTRACT

A method for forming a substrate sheet for optical recording media having a preformat on the surface is disclosed. This method has the steps of extruding a melted resin to form a melted resin sheet, pressing the melted resin sheet between a mirror roll and a resin roll prior to the curing of the melted resin sheet, thereby forming a resin sheet, the resin roll being disposed in the face of the mirror roll and being covered on the peripheral surface thereof with a resin, and forming a photocurable resin composition layer on the surface of the resin sheet with which the resin roll has come in contact, and forming the preformat on the photocurable resin composition layer.

7 Claims, 2 Drawing Sheets

METHOD AND APPARATUS FOR FORMING SUBSTRATE SHEET FOR OPTICAL RECORDING MEDIUM

BACKGROUND OF THE INVENTION

1. Field of the Invention

The present invention relates to a method for forming a substrate for an optical recording medium on which optical recording and reproducing or playback are carried out by a laser beam or the like.

2. Related Background Art

Heretofore, an optical recording medium has been formed by providing a recording layer on a substrate transparent to light such as a semiconductor layer by which recording and playback of information are carried out, and then laminating a protective layer on the recording layer. On the surface of this substrate for the optical recording medium, there are engraved fine preformats of micron order or submicron order such as grooves for tracking and address information pits. As conventional methods for forming these preformats, for example, an injection molding method and a compression molding method are known. However, these methods are unsatisfactory in points of mass productivity and cost.

In order to solve this problem, the present applicant has suggested, in EP-A-0 369 780 and EP-A-0 369 781, methods for preparing substrate sheets for optical recording media which comprises the steps of melting and extruding a resin to mold resin sheets, and then pressing the melted resin sheets 104 between a molding roll 102, having a preformat pattern on the surface thereof, and an oppositely disposed mirror roll 101 to transfer preformats thereto as shown in FIG. 3.

According to the above-mentioned methods, the substrate sheets for optical recording media can be continuously formed which are excellent in transferability of the preformat and which controls double refraction which will be the cause of the decline in a C/N value, even when a resin such as polycarbonate which easily causes the double refraction is used.

However, as a result of the investigations on the above-mentioned methods, it has been found that the double refraction and the transfer accuracy of the substrate sheet for optical recording media change owing to the increase or decrease of the amount of the extruded melted resin attributable to the slight alteration of conditions at the time of the molding, for example, the heating temperature of an extruder or a T-die. This increase or decrease of the amount of the extruded melted resin causes the change of the thickness of the melted resin sheet pressed between the molding roll 102 and the mirror roll 101. On the other hand, the molding roll 102 and the mirror roll 101 which can be used are each made usually from a steel roll plated with chromium, and therefore, it can be considered that when the thick melted resin sheet 104 is extruded from a T-die 105 and then pressed by the rolls, excessive pressure is applied to the resin sheet, with the result that the value of the double refraction and the transfer accuracy of the substrate sheet for optical recording media are uneven.

In order to solve the above-mentioned problem, there is a technique for covering the surface of the mirror roll 101 with a resin. According to this technique, when the polycarbonate sheet coming from the T-die is molded by a resin roll and the molding roll, the resin is not forcedly pressed, so that the resultant substrate for optical recording media is less strained in the process of the sheet's preparation.

However, in the case that the resin roll is used, it is necessary to subject the surface of the resin roll to a mirror processing, but the resin roll is poorer in durability as compared with a metal roll. Thus, as molding is repeatedly carried out, the surface of the resin is damaged, and the surface of the roll must often be polished or the roll is required to be exchanged.

SUMMARY OF THE INVENTION

The present invention has been accomplished to solve the above-mentioned problems, and an object of the present invention is to provide a method and an apparatus for forming a substrate sheet for optical recording media having small and uniform double refraction and the good transfer accuracy of a preformat pattern.

The method for forming the substrate sheet for optical recording media of the present invention is a method for forming a substrate sheet for optical recording media having a preformat on the surface thereof which is characterized by comprising:

a step of extruding a melted resin to form a melted resin sheet, a step of pressing the melted resin sheet between a mirror roll and a resin roll prior to the curing of the melted resin sheet, thereby forming a resin sheet, the resin roll being disposed in the face of the mirror roll and being covered on the peripheral surface thereof with a resin, and a step of forming a photocurable resin composition layer on the surface of the resin sheet with which the resin roll has come in contact, and forming the preformat on the photocurable resin composition layer.

Furthermore, an apparatus for forming a substrate sheet for optical recording media of the present invention is an apparatus for forming a substrate sheet for optical recording media having a preformat on the surface which comprises:

a means for extruding a melted resin to form a melted resin sheet, a mirror roll and a resin roll for pressing the melted resin sheet therebetween to form a resin sheet, the resin roll being disposed in the face of the mirror roll and being covered on the peripheral surface thereof with a resin, a molding roll disposed in the face of the first surface of the resin sheet with which the resin roll has come in contact, the molding roll being equipped with a pattern corresponding to the preformat and being rotated in a predetermined direction, a means for forming a photocurable resin composition layer on the first surface of the resin sheet or the peripheral surface of the molding roll, said means being disposed on the first surface of the resin sheet, a means for pressing the resin sheet against the molding roll with the interposition of the photocurable resin composition layer, a means for irradiating the photocurable resin composition layer with light, this means being disposed at a position apart from the press position of the resin sheet against the molding roll in a rotational direction of the molding roll, and a means for separating, from the molding roll, a photocured resin composition layer which has been integrated with the resin sheet by the light irradiation of the irradiation means and to which the preformat pattern has been transferred.

That is, in the present invention, the step for extruding the melted resin sheet to mold the resin sheet is separated from the step for forming the preformat on the resin sheet, and in the molding step of the resin sheet, the resin roll having elasticity and heat insulating properties is used, whereby excessive pressure is not applied to the melted resin sheet and the resin sheet having less strain and less double refraction can be obtained.

In the transfer step of the preformat, the photocurable resin is used, and therefore the transfer of the preformat can be achieved with a high accuracy. In addition, the photocurable resin composition layer is formed on the resin roll contact side of the resin sheet, and hence it is not necessary to process the surface of the resin roll into a mirror surface, which makes the roll processing easy. Moreover, since the resin roll is not required to be often exchanged, and productivity is improved.

DETAILED DESCRIPTION OF THE INVENTION

Next, the present invention will be described in detail in reference to drawings.

Figure 1:
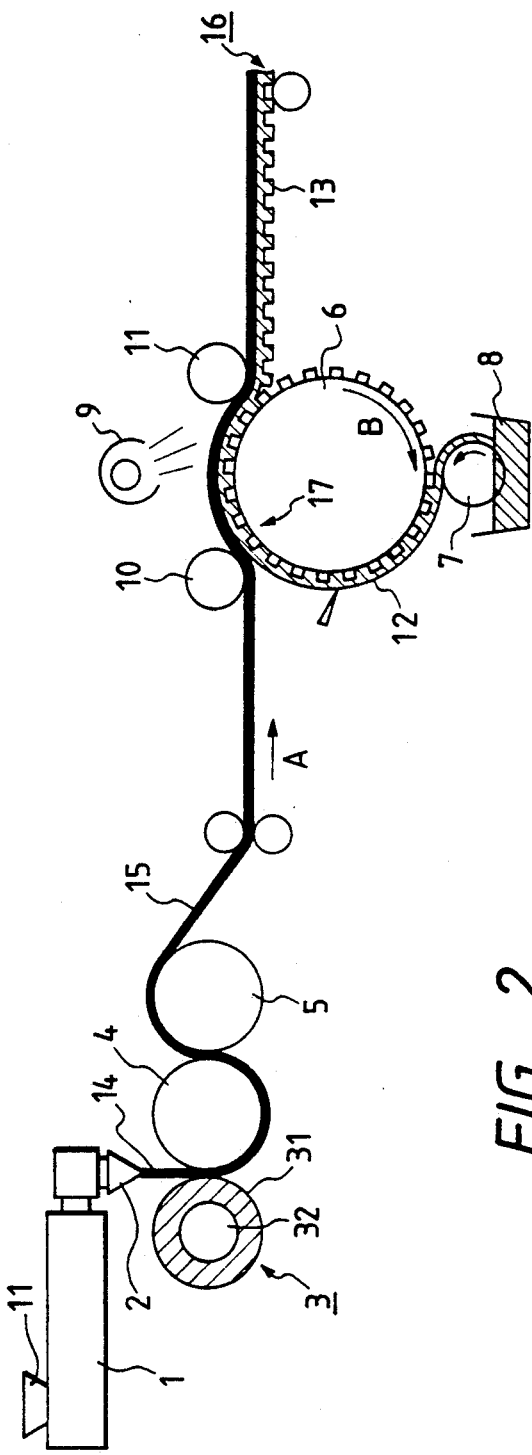
FIG. 1 is a schematic view of an apparatus for forming a substrate sheet for optical recording media of the present invention.

FIG. 1 is an explanatory view showing one embodiment of a method for forming a substrate for optical recording media of the present invention.

In the same drawing, reference numeral 1 is an extruder, numeral 2 is a T-die, numeral 3 is a resin roll whose peripheral surface is covered with a resin, and reference numerals 4 and 5 are a first mirror roll and a second mirror roll, respectively. Reference numeral 6 is a molding roll equipped on the peripheral surface thereof with a preformat pattern corresponding to prepits and/or pregrooves, numeral 7 is a feed roll for forming a photocurable resin composition layer 12 on the molding roll 6, and numeral 8 is a photocurable resin composition. Furthermore, reference numeral 9 is a light irradiation means for curing the photocurable resin composition layer 12, numeral 10 is a press roll for pressing a resin sheet 15 against the molding roll 6 with the interposition of the photocurable resin composition layer 12, and numeral 11 is a separator roll for separating, from the molding roll, a substrate sheet 16 for optical recording media which has been obtained by curing the photocurable resin composition layer with the light irradiation means 9 to integrate the photocurable resin composition layer with the resin sheet 15 and to which the preformat pattern has been transferred.

Next, a method for forming a polycarbonate substrate sheet for optical recording media by the use of the above-mentioned apparatus will be described in reference to FIG. 1.

In FIG. 1, pellets of the polycarbonate are first thrown into the hopper 11 of the extruder 1. The thrown pellets are heated and melted in the extruder 1, and the melted resin is then extruded into the shape of sheet by the T-die 2 connected to the extruder 1. The melted resin sheet 14 which has been extruded by the T-die 2 is introduced into a gap between the resin roll 3 and the second mirror roll 4 and then pressed. At this time, the resin roll is used to relieve the pressure to some extent which has been applied to the melted polycarbonate resin sheet 14, and the strain of the polycarbonate can be reduced. That is, the polycarbonate sheet extruded through the T-die has uneven thickness, and the pressure which is applied to the thick portion is high and the strain which is applied thereto is also high. However, when the above-mentioned resin roll is used, such an unevenness of the thickness can be absorbed to some extent by the elasticity of the resin, whereby the pressure which is applied to the polycarbonate can be made constant. As a result, the polycarbonate resin sheet 15 having less double refraction and the uniform thickness can be molded. Then, the thus obtained resin sheet 15 is delivered in the direction of an arrow A.

On the other hand, the molding roll 6 is rotated in the direction of an arrow B, and on the peripheral surface of this molding roll 6, the photocurable resin composition layer 12 is continuously formed by the feed roll 7.

Next, the resin sheet 15 is pressed against the molding roll 6 by the pressing action of the press roll 10, with the interposition of the photocurable resin composition layer 12 therebetween and the photocurable resin composition layer 12 is then cured by light from the light irradiation means 9 disposed at a position apart from a press position 17 in the rotational direction B of the molding roll so as not to irradiate the press position 17 of the resin sheet 15 against the molding roll 6, so that the resin composition layer 12 is integrated with the resin sheet 15 and a preformat pattern is transferred to the resin composition layer 12, thereby obtaining a substrate sheet 16 for optical recording media which has the preformat 13 on the surface thereof.

In the present invention, when the resin sheet 15 is pressed against the molding roll 6, it is preferred that the surface (hereinafter referred to as "first surface") of the resin sheet 15 which had been in contact with the resin roll 3 is brought into contact with the molding roll 6. That is, the surface of the resin roll 3 generally tends to be damaged and it is difficult to maintain the first surface of the resin sheet 15 in a mirror state, but since the first surface is pressed by the molding roll 6, the photocured resin composition layer 12 is brought into contact with the first surface of the resin sheet 15. Simultaneously, the preformat pattern on the peripheral surface of the molding roll 6 is transferred to the surface of the photocured resin composition layer 12. Thus, the surface state on the first surface of the resin sheet 15 is not influential any more, and as a result, it is unnecessary to accurately control the surface state of the resin roll 3.

Next, some examples of the photocurable resin composition which can be used in the present invention are ultraviolet rays curable resin compositions and electron beam curable resin compositions. Examples of the ultraviolet rays curable resin compositions include usual ultraviolet rays curable resin compositions each comprising a photopolymerizable oligomer, a photopolymerizable monomer, a photopolymerization initiator and the like. Examples of the photopolymerizable oligomer include acrylates such as unsaturated polyesters, epoxyacrylates, urethane acrylates and polyether acrylates. Examples of the photopolymerizable monomer include mono-functional monomers such as lauryl acrylate, 2-ethylhexyl acrylate, 1,6-hexanediol monoacrylate and dicyclopentadiene acrylate, and polyfunctional monomers such as dicyclopentenyl acrylate, 1,3-butanediol diacrylate, polyethylene glycol diacrylate, pentaerythritol triacrylate, dicyclopentenyloxyethyl acrylate, 1,4-butanediol diacrylate, 1,6-hexanediol diacrylate, diethylene glycol diacrylate, neopentyl glycol diacrylate, hydroxypivalic acid ester neopentyl glycol diacrylate, tripropylene glycol diacrylate, 1,3-bis(3'-acryloxyethoxy-2'-hydroxypropyl)-5,5-dimethylhydantoin, diacrylates of hydroxypivalic acid ester neopentyl glycol derivatives and trimethylolpropane triacrylate. Furthermore, usable examples of the photopolymerization initiator include benzophenone, benzoin and their derivatives, benzoin ether and benzyldimethylketal.

The photocurable resin composition is preferably regulated so that the refractive index of the resin composition layer cured by the light irradiation may be substantially equal to that of the resin sheet. That is, when the cured film of the photocurable resin composition layer 12 having about the same refractive index as in the resin sheet 15 is formed on the first surface of the resin sheet 15, refraction and/or irregular reflection of the interface between both the layers can be controlled sufficiently, even if the first surface of the resin sheet 15 is rough. When this kind of substrate sheet is used, the excellent optical recording media which can reproduce signals having a high S/N ratio can be prepared. Incidentally, the above-mentioned "substantially equal" in the present invention means that the refractive index of the resin sheet material is in the range of an error of ±0.02, particularly in the range of an error of ±0.01.

Furthermore, the refractive index of the photocurable resin composition depends upon the total values of the refractive indexes of the respective materials of the composition, for example, the photopolymerizable oligomer and the photopolymerizable monomer, and therefore the photocurable resin composition having the desired refractive index can be obtained by suitably combining the materials of the resin sheet.

Next, in the case that a polycarbonate (refractive index 1.59) is used as the resin sheet, a bifunctional or a trifunctional oligomer is preferable as the ultraviolet rays curable resin composition suitably usable in the present invention which has a substantially equal refractive index and which does not warp the substrate sheet 16 for optical recording media. Moreover, a preferable example of the photopolymerizable monomer is a bifunctional or a trifunctional monomer of the above-mentioned monomers. From these oligomers and monomers, what have a refractive index of about 1.59 to 1.70 and a refractive index of about 1.45 to 1.59 are suitably selected and mixed.

In the present invention, when the oligomer of $n_D° = 1.605$ represented by the undermentioned formula (I) is mixed with the monomer (1,6-hexanediol diacrylate) of $n_D^{20} = 1.458$ represented by the undermentioned formula (II) in a ratio of 9:1, the resultant composition can have about the same refractive index as in the polycarbonate. In addition, this composition prevents an organic dye from having a bad influence on the recording layer, if the organic dye is contained in the recording layer, and it also prevents the substrate sheet 16 for optical recording media from warping. Moreover, the above-mentioned composition improves the adhesive properties between the photocured resin composition layer and the resin sheet, and therefore it is a composition which can be particularly suitably used in the present invention.

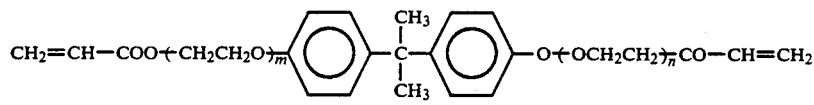

Formula (I)

wherein $m+n=2$ to 10

$CH_2=CHCOO(CH_2)_6OCOCH=CH_2$. Formula (II)

Next, a resin for the resin layer 31 of the resin roll 3 in the present invention is required to be heat-resistant. The roll itself will be heated up to a temperature of 120° to 150° C. and will be then brought into contact with the polycarbonate at about 280° C., and therefore the resin preferably has heat resistance which can withstand at least 200° C., particularly 220° C. or more.

Here, the heat resistance means that the resin layer does not melt, deform, decompose or bring about other mechanical physical changes at 200° C. for at least 2 hours, preferably 50 hours, between a roll base and a stamper at the time of the molding of the substrate sheet.

When the resin layer 31 is formed on the peripheral surface of the roll base 32 constituting the resin roll 3, it is preferable to use a resin having a tensile elongation of 200% or less, preferably 180% or less, more preferably 150% or less, and it is more preferable to use a resin having a tensile elasticity modulus of 200 to 1000 kg/mm² in accordance with ASTM D-882.

As such a resin, any kind of resin can be used, so long as it meets the above-mentioned requirements. When there is used a polyimide, a fluororesin, a polyetherether ketone (PEEK), a polyether sulfone (PES), a polyparabanic acid resin, a polyphenylene oxide, a polyphenylene sulfide (PPS), a polyarylate resin, an epoxy resin or a silicone resin, the double refraction of the resin sheet can be decreased In particular, the polyimide, PEEK, PES, the polyparabanic acid resin, the polyphenylene oxide, PPS, the polyarylate resin or the fluororesin can control the influence of the fluctuation of the molding conditions on the substrate sheet.

The above-mentioned resins will be described in more detail. An example of the polyimide resin is a resin represented by the formula

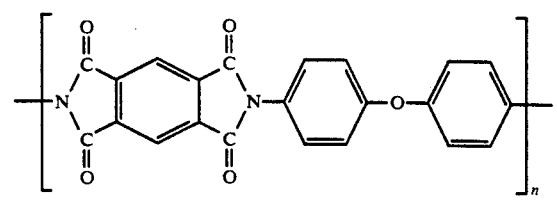

which can be prepared from an aromatic dicarboxylic anhydride such as pyromellitic anhydride and an aromatic diamine such as diaminodiphenyl ether. Examples of the fluororesin include homopolymers such as polytetrafluoroethylene (PTFE), polymonochlorotrifluoroethylene (PCTFE), polyvinylidene fluoride (PVDF) and polyvinyl fluoride (PVF) as well as copolymers such as tetrafluoroethylene perfluoroalkylvinyl ether copolymer (PFA) and fluorinated ethylenepropylene copolymer (FEP).

PEEK is a polymer represented by the formula

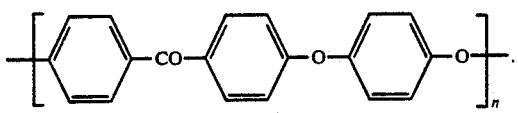

PES is a polymer represented by the formula

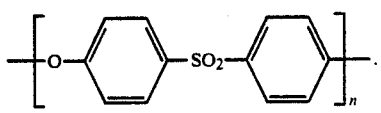

Examples of the epoxy resin are products having a molecular weight of about 5000 or more, preferably 8000 or more which can be obtained from bisphenol A and epichlorohydrin and from an alicyclic compound and derived from polybutadiene.

The polyparabanic acid resin (PPA) is a polymer represented by the formula

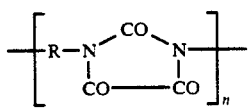

(wherein R is

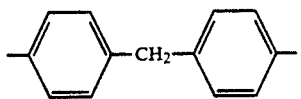

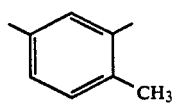

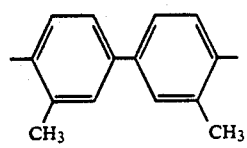

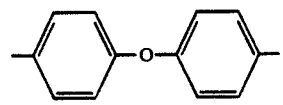

The polyphenylene sulfide (PPS) is a polymer represented by the formula

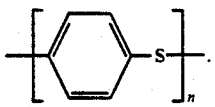

The polyarylate (PA) is an aromatic polyester resin which can be made by the polycondensation reaction of an aromatic dicarboxylic acid with a bisphenol, and when the bisphenol is, for example, bisphenol A, the polyarylate has a structure represented by the formula

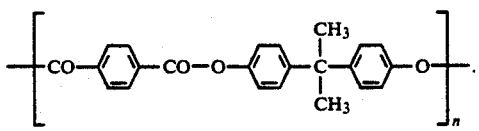

Furthermore, the thickness of the resin layer 31 is preferably from 0.1 to 15 mm, particularly 0.3 to 5 mm, since the double refraction of the resin sheet can be uniformly decreased and its thickness can also be uniformized.

The molding roll 6 is formed on the peripheral surface thereof with a preformat pattern corresponding to the preformat 13 on the surface of the substrate sheet 16 for optical recording media, and this kind of molding roll 6 can be prepared by attaching a plate stamper made by a usual method onto the surface of the roll with an adhesive, by mechanically securing the stamper on the roll surface by screws, by directly engraving on the mirror roll, or by another technique.

The preformat pattern which can be used in the present invention is a spiral pattern, a concentric circle-like pattern and a stripe pattern corresponding to tracking grooves for optical discs and optical cards, each pattern having a width of 1 to 4 μm, a pitch of 1 to 20 μm and a depth of 200 to 5000° as well as a pattern corresponding to address pits, this pattern having a width of 0.6 to 10 μm, a length of 0.6 to 20 μm and a depth of 200 to 5000Å.

Next, the melted resin sheet 14 extruded from a T-die 2 in the molding step of the resin sheet 15 of the present invention is preferably pressed between the resin roll 3 and the mirror roll 4, while the sheet 14 is extremely close to a melting state. Accordingly, the temperature of the T-die preferably is as high as possible, so long as the resin does not decompose, and it is preferably in the range of the glass transition temperature (hereinafter abbreviated to "Tg") of the molded resin+110° C. to Tg+200° C., particularly Tg+130° C. to Tg+190° C. For example, in the case of the polycarbonate resin, the temperature of the T-die is 260° to 340° C., preferably 280° to 330° C., more preferably 290° to 320° C.

If the resin sheet is cooled between the T-die 2 and the molding roll, the preformat pattern is not sufficiently transferred and the double refraction tends to occur. Therefore, the distance between the T-die 2 and the pressing point of the molding roll 3 and the first mirror roll 4 is 20 cm or less, preferably 15 cm or less, more preferably 10 cm or less, and the temperature of an ambient atmosphere therebetween preferably is 60° C. or more.

Figure 2:
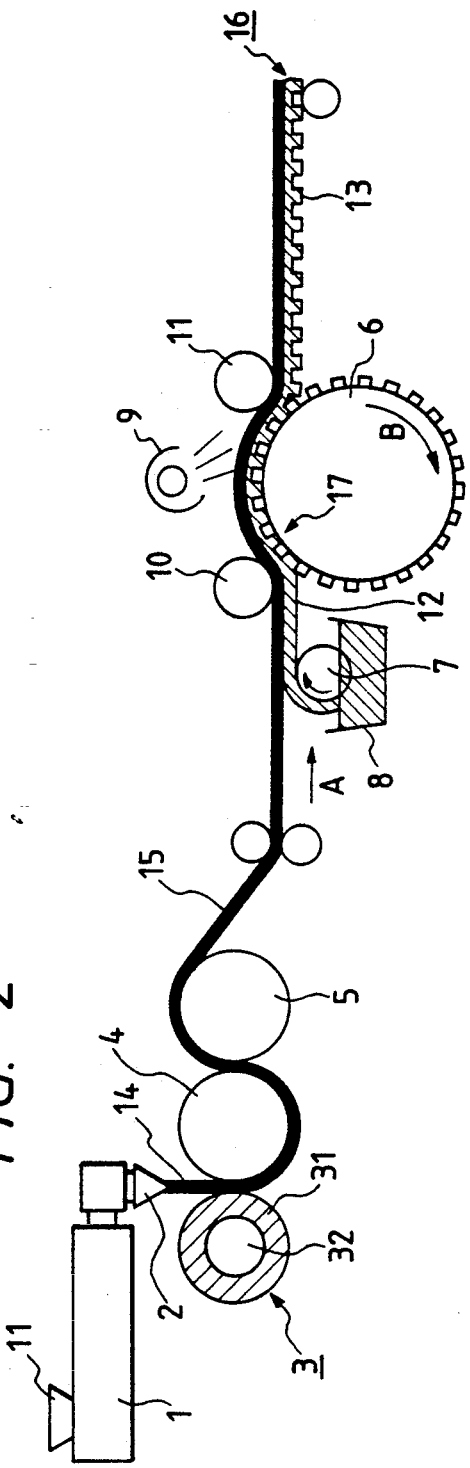
FIG. 2 is a schematic view of another embodiment of an apparatus for forming the substrate sheet for optical recording media of the present invention.
Figure 3:
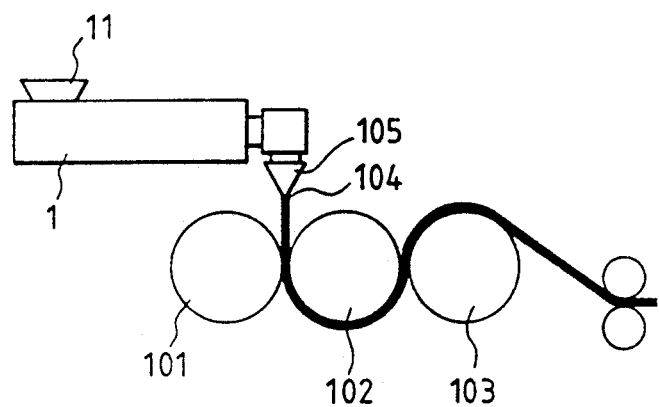
FIG. 3 is a schematic view of a method for forming a conventional substrate sheet for optical recording media.

In order to precisely extrude the resin sheet toward the pressing point, the constitution of vertical extrusion is preferably taken as shown in FIGS. 1 and 2 in which the pressing point is disposed vertically under the T-die. This reason is that the resin is nearly in the melting state and so the vertical extrusion permits extruding the resin toward the pressing point more accurately than horizontal extrusion.

Surface temperatures of the resin roll 3 and the mirror rolls 4, 5 depend upon the kind of resin to be used, but for example, in the case that the polycarbonate is used, the temperature of the mirror roll 4 is usually set to 110°–145° C. considering the heat deformation temperature of the polycarbonate, that of the resin roll is set to 90°–135° C., and that of the mirror roll 5 is set to 120°–150° C. In the case that amorphous polyolefin is used, the temperature of the mirror roll 4 is set to 120°–145° C., that of the resin roll 3 is set to 100°–135° C., and that of the mirror roll 5 is set to 120°–150° C. The temperatures of these rolls can be controlled, for example, by heating them with a heater incorporated in the rolls or by circulating a hot medium to the central portions of these rolls.

A resin which can be used as the material for the resin sheet 15 in the present invention is preferably a thermoplastic resin having high transmission to light for record and reproduction Examples of such a resin include acrylic resins, polyester resins, polycarbonate resins, vinyl resins, polysulfone resins, polyolefin resins and cellulose derivatives.

In the present invention, a base 32 of the resin roll and bases of the mirror rolls 4, 5 and the molding roll preferably have high hardness, good thermal conductivity and easy mirror surface workability on peripheral surfaces. For example, steel, chromium steel, aluminum or steel (maraging steel) for molds can be used as the base materials.

FIG. 2 shows another embodiment of the preparation method of the substrate sheet for optical recording media regarding the present invention, and the steps until the molding of the resin sheet 15 are identical with those of the embodiment in FIG. 1. Afterward, the photocurable resin composition layer 12 is formed on the first surface of this resin sheet 15 by the use of a coating roll 7 for the photocurable resin composition 8, and the resin sheet 15 is pressed against the molding roll 6 with the interposition of the photocurable resin composition layer 12 by means of the press roll 10. Then, the photocurable resin composition layer 12 is then cured by light from the light irradiation means 9 disposed at a position apart from a press position of the resin sheet 15 against the molding roll 6 in the rotational direction B of the molding roll 6, so that the resin composition layer is integrated with the resin sheet and a preformat pattern is transferred to the resin composition layer, thereby obtaining the substrate sheet 16 for optical recording media which has the preformat 13 on the surface thereof.

The thus obtained substrate sheet 16 for optical recording media is wound up and then delivered to a recording layer and/or refractive layer forming step, a protective layer forming step or a step of forming a hard coat layer on the incident surface of recording and/or reproduction light on the substrate sheet 16 for optical recording media. Alternatively, after the molding of the substrate sheet 16 for optical recording media, the above-mentioned respective steps may be continuously carried out.

As materials of the recording layer which is formed on the surface of the substrate sheet for optical recording media on which the preformat has been transferred, there can be used oxides of Te, Sb, Mo, Ge, V and Sn; inorganic compounds such as Sn and TeOx—Ge; composites of metals and organic compounds or inorganic sulfides such as Te—$CH_4$, Te—$CS_2$, Te-styrene, Sn—$SO_2$, GeS—Sn and SnS—S; thermoplastic resins such as nitrocellulose, polystyrene and polyethylene containing the dispersed particles of a metal such as silver; chalcogen elements; magnetic films of Tb—Fe—Co, Gd—Fe—Co, Tb—Fe—Co—Cr, Gd—Fe—Co—Cr and the like; and organic dyestuffs.

In the case that the organic dyestuff is used as the recording layer and the wave length of the energy beam of light such reproduction light is 650 nm or more, particularly 700 to 900 nm, it is preferable that a difference between the reflectance of pits which are recorded portions and that of unrecorded portion is large. In addition, in order to achieve the recording, it is necessary that absorption is present in the above-mentioned wave length section. Moreover, energy necessary to cause the change of the reflectance by the irradiation of the energy beam is preferably small. It is also preferable that the reflectances of the recorded portions (pits and the like) and the unrecorded portions scarcely change under the influence of the energy beam of the reproduction light. Examples of such an organic dyestuff include anthraquinone derivatives (in particular, compounds having an indanthrene skeleton), dioxazine compounds and their derivatives, triphenodithiazine compounds, phenanthrene derivatives, cyanin compounds, merocyanin compounds, pyrylium series compounds, xanthene series compounds, triphenylmethane series compounds, croconium series compounds, azo dyestuffs, crocons, azines, indigoids, polymethine dyes, azulenes, squalium derivatives, sulfur dyes and dithiolate complexes of metals.

The above-mentioned dye may be mixed with a stabilizer. Examples of the stabilizer include metal chelate compounds, multidentate ligands containing Zn, Cu, Ni, Cr, Co, Mn, Pd and Zr as the central metals, for example, tetradentate ligands such as $N_4$, $N_2O_2$, $N_2S_2S_4$, $O_2S_2$ and $O_4$ and combinations thereof, aromatic amines and diamines, nitrogen-containing aromatic compounds and onium salts thereof, for example, aminium salts, diimonium salts, pyridinium salts, imidazolinium salts and quinolinium salts, pyrylium salts which are the salts of oxygen-containing aromatic compounds, and mixture thereof.

The desirable stabilizer should be selected from the above-mentioned group considering the compatibility with a solvent which is used together with the organic dye The amount of the stabilizer is preferably 1 to 50% by weight based on the organic dye, and in particular, when the amount of the stabilizer is from 10 to 30% by weight, the deterioration of sensitivity is inhibited and the large effect of the stabilizer can be obtained.

The solvent which is used to dissolve the above-mentioned organic dye and stabilizer therein must not affect the resin sheet, and examples of the solvent include diacetone alcohol, cellosolve, 1-methoxy-2-propanol and mixed solvents of the same and halogen series solvents.

Furthermore, the coating of the recording layer can be achieved by a technique such as gravure coating, curtain coating, spray coating, dip coating, bar coating and blade coating.

In the present invention, the thickness of the recording layer is preferably in the range of 500 to 5000Å.

As described above, according to the method for forming the substrate for optical recording media of the present invention, the molding step of the resin sheet is separated from the transfer step of the preformat pattern. First, in the molding step for the resin sheet, the elastic resin roll is used, and therefore the resin sheet is not forcedly pressed, so that the substrate sheet having less strain and less double refraction can be obtained.

In addition, in the transfer step of the preformat pattern, the photocurable resin composition layer 12 is formed on the resin roll contact surface of the resin sheet 15, and so it is not necessary to process the surface of the resin roll into a mirror surface, which makes the roll processing easy. Moreover, the resin roll is not required to be often exchanged, and productivity is improved.

In the case that either surface (the surface on the side of the photocured resin layer) of the resin sheet substrate is rough, the adhesive properties between the resin sheet 15 and the photocured resin composition layer 12 are further improved The refractive index of the photocured resin composition layer can be adjusted to be substantially equal to that of the resin sheet 15, whereby the substrate for optical recording media which can reproduce signals having less noise and a high S/N ratio can be prepared.

EXAMPLE 1

Chromium plating having a thickness of 0.3 mm was deposited on the peripheral surface of an iron roll having a diameter of 300 mm and a width of 200 mm, and the surface of the chromium plating was then mirror-finished to a surface roughness of 0.1 μm. Afterward, a silicone resin layer (trade name: SE 1188; Toray Silicon Co., Ltd.) having a thickness of 2 mm was formed on the peripheral surface of the chromium plating to obtain a resin roll. On the other hand, chromium plating having a thickness of 0.3 mm was deposited on the peripheral surface of an iron roll having a diameter of 300 mm and a width of 200 mm, and the surface of the chromium plating was then mirror-finished to a surface roughness of 0.1 μm, thereby obtaining mirror rolls 4 and 5.

An Ni stamper having a pattern corresponding to a preformat for optical cards having a groove width of 2.5 μm, a pitch of 12 μm and a groove depth of 3000Å was stuck on the peripheral surface of the mirror roll having a diameter of 400 mm and a width of 150 mm by the use of an epoxy adhesive (trade name EP-170, made by Cemedine Co., Ltd.), and an apparatus for forming a substrate sheet for optical cards shown in FIG. 1 was then prepared. As a resin sheet material, polycarbonate (trade name Panlite L-1250; made by Teijin Chemicals Co., Ltd.) was used, and a resin sheet was extruded under conditions of an extrusion width of 200 mm, a roll gap of 0.4 mm and an extrusion speed of 3 m/minute. With regard to the molding conditions, the surface temperature of the resin roll 3 was 120° C., the surface temperature of the mirror roll 4 was 130° C., and the temperature of a T-die was 300° C.

On the other hand, an ultraviolet curable resin composition layer having the following composition and a thickness of 15 μm was formed on the peripheral surface of the molding roll 6 by the use of a feed roll 7.

Resin Composition (a) 87.3 parts by weight of a photopolymerizable oligomer represented by the formula

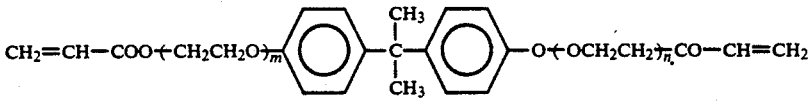

wherein m+n=2 to 10. (trade name NK Ester ABPE-4, made by Shin-Nakamura Chemicals, Inc.)

(b) 9.7 parts by weight of a photopolymerizable monomer represented by the formula

(trade name NK Ester A-HD, made by Shin-Nakamura Chemicals, Inc.)

(c) 3 parts by weight of a photopolymerization initiator represented by the formula

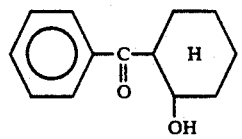

(trade name Irgacure 184, made by Ciba-Geigy).

The above-mentioned ultraviolet curable resin composition was regulated so that the refractive index of the cured film of this resin composition might be the that of the polycarbonate, i.e., 1.59.

Next, the extruded polycarbonate resin sheet 15 was mounted on the molding roll 6 with the interposition of the ultraviolet cured resin composition layer 12. At this time, the surface of the polycarbonate resin sheet which had came in contact with the resin roll at the time of the previous extrusion step was brought into contact with the molding roll with the interposition of the ultraviolet curable resin composition layer 12.

Next, after the polycarbonate resin sheet 15 was mounted on the molding roll, the ultraviolet curable resin composition layer 12 was irradiated through the resin sheet with ultraviolet rays from a position 15 cm above the resin sheet by the use of an ultraviolet lamp (a 4 KW high-pressure mercury vapor lamp) to cure the ultraviolet curable resin composition layer. Then, the polycarbonate resin sheet which had been integrated with the ultraviolet cured resin composition layer was released from the molding roll, thereby preparing a substrate sheet for optical cards in which a relief pattern was transferred to the resin sheet.

For the thus obtained substrate sheet for the optical cards, double refraction was measured at optional 9 points in each preformat-transferred portion. As a result, average values of the double refraction in all the portions were 20 nm or less. The double refraction was measured with a laser beam having a wave length of 830 nm and a spot diameter of 1 μm by the use of a polarimeter (SP-224 type; made by Sinko Seiki Co., Ltd.), and the double refraction was the value of single pass. The obtained substrate was optically homogeneous, and it was excellent in the transferability of the relief pattern.

Next, the surface of the substrate sheet for optical cards on which the preformat was formed was coated with a 2% diacetone alcohol solution of 1,1,5,5-tetrakis(p-diethylaminophenyl)-1,3-pentadienyl perchlorate which was a polymethine series dye, thereby forming a recording layer having a thickness of 1000Å. Afterward, the polycarbonate sheet having a thickness of 0.3 mm was laminated on the recording layer with the interposition of an ethylene-vinyl acetate copolymer hot-melt adhesive sheet, and the resultant laminate was then passed between a pair of heating rolls having a surface temperature of 110° C. to thermally press the same. Then, the sheet was cut into a size (length 85 mm×width 54 mm) of the optical cards to obtain the optical cards.

The thus obtained optical cards were moved at a speed of 400 mm/second by the use of an optical card recording/reproducing device (made by Canon Inc.),

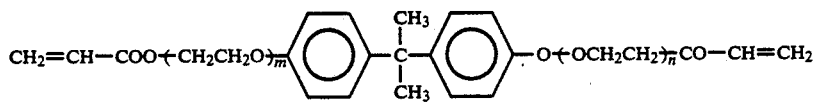

and a signal at a frequency of 100 KHz under a recording power of 10 mW was recorded by the use of a semiconductor laser having a wave length of 830 nm. Next, the signal was reproduced under a semiconductor laser

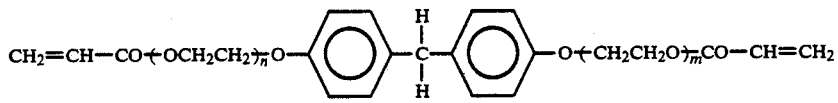

power of 0.2 mW. The noise level of the reproduced signal and the level of a carrier signal are shown in Table 1.

The incidence of the recording light and the reproducing light to the optical cards was carried out through the substrates.

COMPARATIVE EXAMPLE 1

The same procedure as in Example 1 was effected except that an ultraviolet curable resin composition layer was formed on the surface of a resin sheet 15 with which a mirror roll 4 had been come in contact, thereby obtaining a substrate sheet for optical cards The double refraction of this substrate sheet was measured in the same manner as in Example 1, and as a result, it was 20 nm or less.

Next, optical cards were prepared from this substrate sheet for optical cards in the same manner as in Example 1, and recording and reproduction were then carried out.

The results are set forth in Table 1.

TABLE 1

|  | Example 1 | Comp. Ex. 1 |
| --- | --- | --- |
| C/N Value | 51.0 dB | 43.2 dB |
| Carrier Level | −25.9 | −19.2 |
| Noise Level | −76.9 | −62.4 |

EXAMPLE 2

In the resin sheet molding step of Example 1, a heat shrinkage tube (made by Gunze Limited) of perfluoroalkylvinyl ether copolymer having a thickness of 0.5 mm was used in place of a silicone resin as a resin roll 3. A resin sheet was molded under conditions of the temperature of the resin roll=140° C., the temperature of a mirror roll 4=150° C. (a temperature of a T-die =300° C.), a roll gap=0.4 mm and an extrusion speed=4 m/minute.

A molding roll was prepared in the same manner as in Example 1 which had a diameter of 400 mm and a width of 200 mm.

The peripheral surface of this molding roll 6 was coated with an ultraviolet curable resin composition layer comprising the following composition and having a thickness of 10 μm.

Resin Composition (a) 74.3 parts by weight of a photopolymerizable oligomer represented by the formula (wherein m+n=2 to 10). (trade name NK Ester ABPE-4, made by Shin-Nakamura Chemicals, Inc.).

(b) 22.7 parts by weight of a photopolymerizable monomer represented by the formula (wherein m+n=4). (trade name Kayarad R-712, made by Nippon Kayaku Co., Ltd.).

(c) 3 parts by weight of a photopolymerization initiator represented by the formula

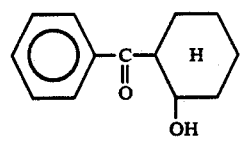

(trade name Irgacure 184, made by Ciba-Geigy).

The above-mentioned ultraviolet curable resin composition was also regulated so that the refractive index of the cured film of this resin composition might be about 1.59.

The subsequent steps were carried out by the same procedure as in Example 1 to obtain a substrate sheet for optical cards.

The double refraction of this substrate sheet was measured in the same manner as in Example 1, and as a result, it was 10 nm or less. The obtained substrate optically homogeneous, and it was excellent in the transferability of the relief pattern.

Next, the surface of the substrate for optical cards which had been formed with a preformat pattern was coated with a 1.6% by weight dichloroethane solution of an azulene series dye having the structure

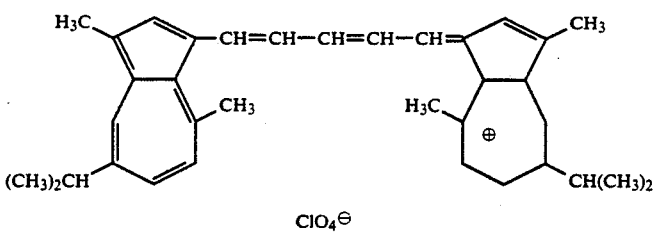

to form a recording layer having a thickness of 1000Å, and an optical card was prepared in the same manner as in Example 1. This card was evaluated in the same manner as in Example 1. The results are set forth in Table 2.

TABLE 2

|  | Example 2 |
| --- | --- |
| C/N Value | 51.9 dB |
| Carrier Level | −27.7 |
| Noise Level | −79.6 |

EXAMPLE 3

The same procedure as in Example 1 was effected except that a resin layer 31 on the peripheral surface of a resin roll was replaced with a polyimide resin layer (trade name LARC-TPI; made by Mitsui Toatsu Chemicals, Inc.) having a thickness of 3 mm, thereby preparing a substrate sheet for optical cards. The thus prepared substrate sheet was evaluated in the same manner as in Example 1, and as a result, the double refraction of the substrate sheet was 10 nm or less.

Furthermore, a recording layer of the same azulene series dye as in Example 2 was formed on this substrate sheet for optical cards by the same procedure as in Example 2 to prepare optical cards. Evaluation was then made, and at this time, a signal having less noise and an excellent C/N value could be reproduced as in Example 2.

What is claimed is:

1. A method for forming a substrate sheet for optical recording media having a preformat on the surface thereof, said method comprising the steps of:
   (a) extruding a melted resin to form a melted resin sheet having a first surface and a second surface,
   (b) pressing said melted resin sheet between a mirror roll and a resin roll such that the first surface of the melted resin sheet is in contact with the resin roll, thereby forming a resin sheet,
   said resin roll being disposed opposite to said mirror roll and being covered on the peripheral surface thereof with a resin,
   (c) forming a photocurable resin composition layer on the first surface of said resin sheet, and
   (d) curing said photocurable resin composition layer by pressing against said photocurable layer a molding die having a preformat pattern and by irradiating said photocurable layer, so as to form a photocured resin layer having said preformat on its surface, wherein said photocured resin layer has a refractive index substantially equal to the refractive index of said resin sheet.

2. The method for forming a substrate sheet for optical recording media according to claim 1 wherein polycarbonate is used as the material for said resin sheet.

3. The method for forming a substrate sheet for optical recording media according to claim 1 wherein said resin roll is a resin roll equipped on the peripheral surface thereof with a resin layer containing at least one selected from the group consisting of a polyimide resin, a fluororesin, a polyether-ether ketone, a polyether sulfone, a polyparabanic acid resin, a polyphenylene oxide, a polyallylate resin, an epoxy resin and a silicone resin.

4. The method for forming a substrate sheet for optical recording media according to claim 1 wherein a composition containing a bifunctional or a trifunctional photopolymerizable oligomer, a bifunctional or a trifunctional photopolymerizable monomer and a photopolymerization initiator is used as said photocurable resin composition.

5. The method for forming a substrate sheet for optical recording media according to claim 4 wherein an oligomer represented by the formula

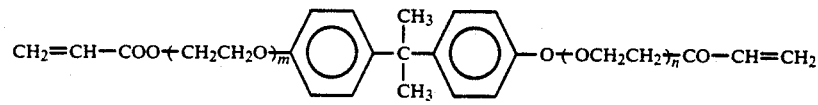

(wherein m+n=2 to 10) is used as said photopolymerizable oligomer.

6. The method for forming a substrate sheet for optical recording media according to claim 4 wherein a monomer represented by the formula

is used as said photopolymerizable monomer.

7. An apparatus for forming a substrate sheet for optical recording media having a preformat on the surface thereof which comprises:
   a means for extruding a melted resin to form a melted resin sheet,
   a mirror roll and a resin roll for pressing said melted resin sheet therebetween to form a resin sheet,
   said resin roll being disposed in the face of said mirror roll and being covered on the peripheral surface thereof with a resin,
   a molding roll disposed in the face of the first surface of said resin sheet with which said resin roll has come in contact, said molding roll being equipped with a pattern corresponding to said preformat and being rotated in a predetermined direction, a means for forming a photocurable resin composition layer on the first surface of said resin sheet or the peripheral surface of said molding roll, this means being disposed on the first surface of said resin sheet, wherein said photocurable resin composition, after curing, has a refractive index substantially equal to the refractive index of said resin sheet, a means for pressing said resin sheet against said molding roll with the interposition of said photocurable resin composition layer, a means for irradiating said photocurable resin composition layer with light, said means being disposed downstream of said mirror roll and said resin roll and at a position apart from the press position of said resin sheet against said molding roll, said means being further disposed for irradiating in a direction that is the same as a rotational direction of said molding roll, and a means for separating, from said molding roll, a photocured resin composition layer which has been integrated with said resin sheet by the light irradiation of said irradiation means and to which said preformat pattern has been transferred.

* * * * *

UNITED STATES PATENT AND TRADEMARK OFFICE
CERTIFICATE OF CORRECTION

PATENT NO. : 5,281,371
DATED : January 25, 1994
INVENTOR(S) : TAMURA, ET AL.

It is certified that error appears in the above-indentified patent and that said Letters Patent is hereby corrected as shown below:

COLUMN 4
    Line 3, "sheet" should read --a sheet--; and
    Line 29, "therebetween" should read --therebetween,--.

COLUMN 5
    Line 62, "$n_D^°=1.605$" should read --$n_D^{20}=1.605$--.

COLUMN 6
    Line 47, "decreased In" should read --decreased. In--; and
    Line 67, "ether. Examples" should read --ether.--; and please start new paragraph with --Examples--.

COLUMN 7
    Line 64, "$(CH_2)_6$" should read --$(CH_2)_6$ or the like--.

COLUMN 8
    Line 39, "5000°" should read --5000Å--.

COLUMN 9
    Line 11, "resin roll" should read --resin roll 3--; and
    Line 24, "reproduction" should read --reproduction.--.

COLUMN 10
    Line 46, "mixture" should read --mixtures--; and
    Line 52, "dye" should read --dye.--.

UNITED STATES PATENT AND TRADEMARK OFFICE
CERTIFICATE OF CORRECTION

PATENT NO. : 5,281,371
DATED : January 25, 1994
INVENTOR(S) : TAMURA, ET AL.

It is certified that error appears in the above-indentified patent and that said Letters Patent is hereby corrected as shown below:

COLUMN 12
    Line 36, "the that" should read --the same as that--; and
    Line 42, "came" should read --come--.

COLUMN 13
    Line 47, "been" should be deleted; and
    Line 48, "cards" should read --cards.--.

COLUMN 14
    Line 62, "substrate" should read --substrate was--.

Signed and Sealed this

Sixth Day of September, 1994

Attest:

BRUCE LEHMAN

Attesting Officer     Commissioner of Patents and Trademarks